(12) United States Patent
Takatsuka et al.

(10) Patent No.: US 8,311,595 B2
(45) Date of Patent: Nov. 13, 2012

(54) PORTABLE WIRELESS COMMUNICATION DEVICE

(75) Inventors: Susumu Takatsuka, Tokyo (JP); Hiroyuki Taniguchi, Tokyo (JP); Shin Takanashi, Kanagawa (JP); Tetsuya Naruse, Kanagawa (JP)

(73) Assignee: Sony Mobile Communications Japan, Inc., Tokyo (JP)

(*) Notice: Subject to any disclaimer, the term of this patent is extended or adjusted under 35 U.S.C. 154(b) by 225 days.

(21) Appl. No.: 12/787,657

(22) Filed: May 26, 2010

(65) Prior Publication Data
US 2010/0311475 A1 Dec. 9, 2010

(30) Foreign Application Priority Data

Jun. 3, 2009 (JP) ................ P2009-134421
Jun. 3, 2009 (JP) ................ P2009-134422

(51) Int. Cl.
*H04M 1/00* (2006.01)
(52) U.S. Cl. .................. 455/575.1; 441/89

(58) Field of Classification Search .......... 455/100, 455/575.1; 441/89; 250/370.07
See application file for complete search history.

(56) References Cited

U.S. PATENT DOCUMENTS

| 5,710,989 A | * | 1/1998 | Flood | ............ 455/100 |
| 2010/0006764 A1 | * | 1/2010 | Bushberg | ......... 250/370.07 |

FOREIGN PATENT DOCUMENTS

JP 2004 172667 6/2004

* cited by examiner

*Primary Examiner* — Phuoc Doan
(74) *Attorney, Agent, or Firm* — Frommer Lawrence & Haug LLP; William S. Frommer; Ellen Marcie Emas

(57) ABSTRACT

A portable wireless communication device includes a case having a waterproof structure and floating on water, an operation portion arranged in a front face of the case; and a wireless communication processing portion arranged inside the case, wherein a position of the center of gravity in the case is shifted to a rear face side opposite to the front face with respect to a center of the case, in a state where all components including the wireless communication processing portion are housed.

11 Claims, 18 Drawing Sheets

PORTABLE WIRELESS COMMUNICATION DEVICE

BACKGROUND OF THE INVENTION

1. Field of the Invention

The present invention relates to a portable wireless communication device suitable for use in, for example, a portable telephone terminal device, and particularly, to a portable wireless communication device with a waterproof structure.

2. Description of the Related Art

There has been proposed and practically used a communication device such as a portable telephone terminal device with a waterproof structure. In this terminal device with a waterproof structure, a joining portion of cases or a place for arranging keys or terminals or the like have a waterproof structure in order for water not to penetrate into the case constituting the terminal device body. By using this terminal device with a waterproof structure, a portable telephone terminal device can be used, for example, at the coast, the waterside, ski resorts or the like, whereby its ease of use has been improved.

An example of the portable telephone terminal device with a waterproof structure is disclosed in Japanese Unexamined Patent Application Publication No. 2004-172677 as a related art.

SUMMARY OF THE INVENTION

The waterproof type portable telephone terminal device in the related art, as described above, is fundamentally for preventing water from penetrating the into terminal device even though water has come onto the terminal device, and thus it is not considered to be used underwater, for example, in a bathtub or a swimming pool. Therefore, even the waterproof type portable telephone terminal device has a problem in that its use has limits.

It is desirable to provide a terminal device with a waterproof structure capable of being effectively used on water or under water.

According to an embodiment of the present invention, there is provided a portable wireless communication device including a case having a waterproof structure and a structure that floats on water. An operation portion is arranged in a front face of the case, and a wireless communication processing portion is arranged inside the case. A position of the center of gravity in the case is shifted to a rear face side opposite to the front face, with respect to a center of the case, in a state where all components including the wireless communication processing portion are housed in the case.

By this configuration, when the communication device body is put in water, the communication device body floats on water, and, at the time of floating, there is a high possibility that the front face side where the operation portion is arranged is upwards so as to float in a good state.

The wireless communication processing portion is included in the case, thus wireless communication can be made, and further by control of a control portion, an operation mode of the device is set to a selected mode of a normal mode and an underwater mode or an on-water mode.

By including the underwater mode or the on-water mode, for example, when a terminal device is underwater or on water, an operation mode suitable for use in that state can be set and thus ease of use under water or on water can be improved.

According to the present invention, when the communication device body is put in water, there is a high possibility that it floats so that the front face side is upwards, and thus the front face side where the operation portion and so on are disposed floats upwards on water. Therefore, a state regarding the portable wireless communication device floating on water can be favorably confirmed by the state in which it can float on water.

According to the present invention, the dedicated operation modes for improving the use under water or on water are provided, and thereby the wireless communication device can be favorably used under water or on water. For example, it is possible to set an operation mode where an incoming call or the like can be easily recognized on water.

BRIEF DESCRIPTION OF THE DRAWINGS

FIG. 11 is a perspective view exemplarily illustrating a portable wireless communication device according to a second embodiment of the present invention, in which

FIG. 16 is a diagram exemplarily illustrating a portable wireless communication device according to a third embodiment of the present invention, in which

FIG. 19 is a diagram exemplarily illustrating a state where the portable wireless communication device according to the third embodiment of the present invention moves on water, in which

DESCRIPTION OF THE PREFERRED EMBODIMENTS

Embodiments of the present invention will be described in the following order.

1. Configuration of a first portable telephone terminal device according to a first embodiment (FIGS. 1 to 3)
2. Description of an internal configuration of the terminal device according to the first embodiment (FIG. 4)
3. Exemplary state used according to the first embodiment (FIGS. 5 and 6)
4. Configuration of a second portable telephone terminal device according to the first embodiment (FIG. 7)
5. An exemplary third portable telephone terminal device according to the first embodiment (FIG. 8)
6. Description of a modification of the first embodiment (FIGS. 9 and 10)
7. Configuration of a portable telephone terminal device according to a second embodiment (FIGS. 11 and 12)
8. Exemplary control mode setting for the portable telephone terminal device according to the second embodiment (FIG. 13)
9. Exemplary operation in the state of floating on water according to the second embodiment (FIGS. 14 and 15)
10. Configuration of a portable telephone terminal device according to the third embodiment (FIGS. 16 and 17)
11. Exemplary operation in the state of floating on water according to the third embodiment (FIGS. 18 to 22)
12. Description of modifications of the third embodiment

[1. Entire form of a first portable telephone terminal Device (wireless communication terminal device) according to A first embodiment (FIGS. 1 to 3)]

To begin with, a configuration of an exemplary wireless communication terminal device according to an embodiment of the present invention will be described with reference to FIGS. 1 to 3. The example in this embodiment is applied to a portable telephone terminal device which is connected to wireless telephone lines by performing a wireless communication with a base station or the like.

Figure 1:
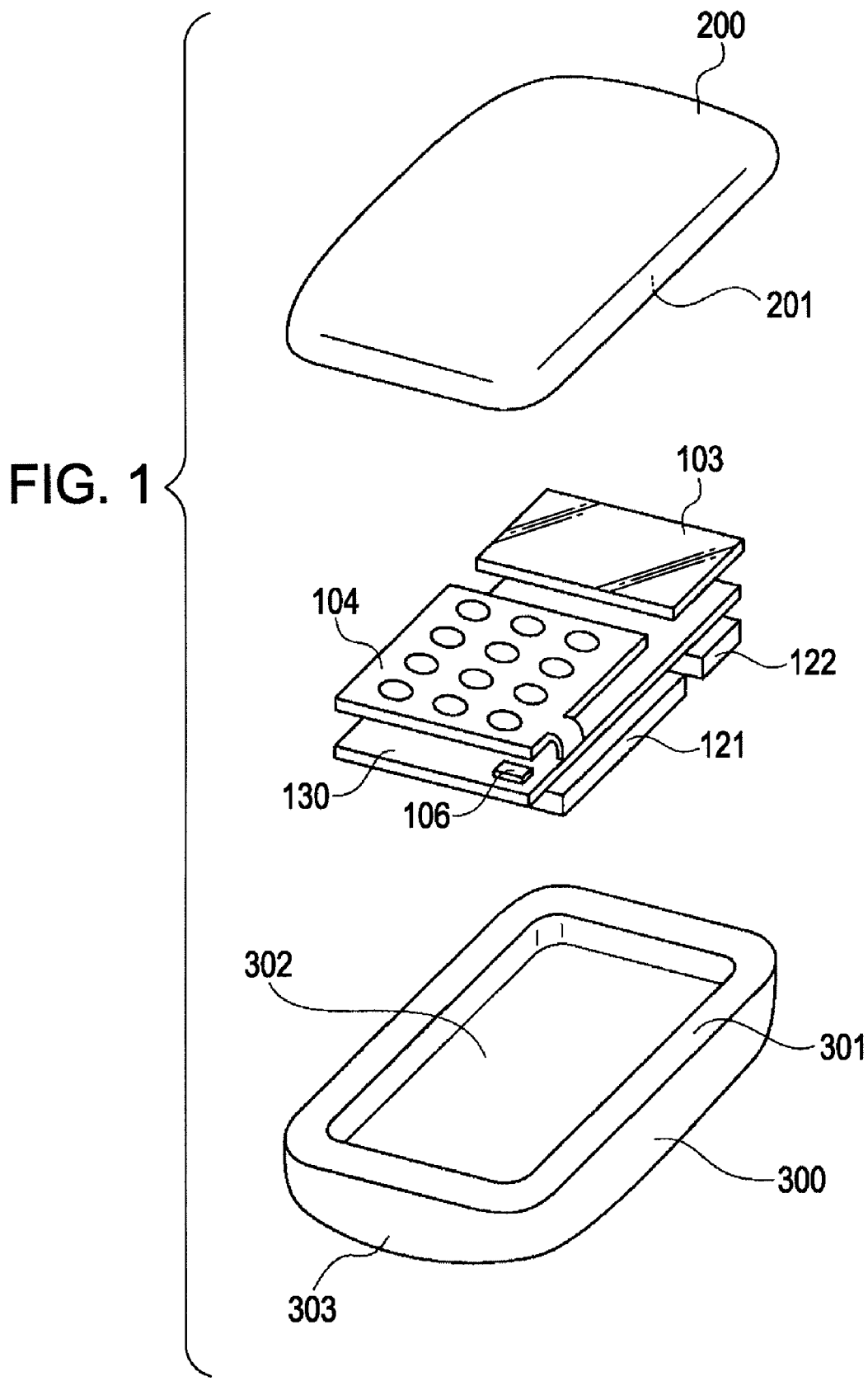
FIG. 1 is an exemplarily exploded perspective view illustrating by explosion a first portable wireless communication device according to a first embodiment of the present invention.
Figure 2:
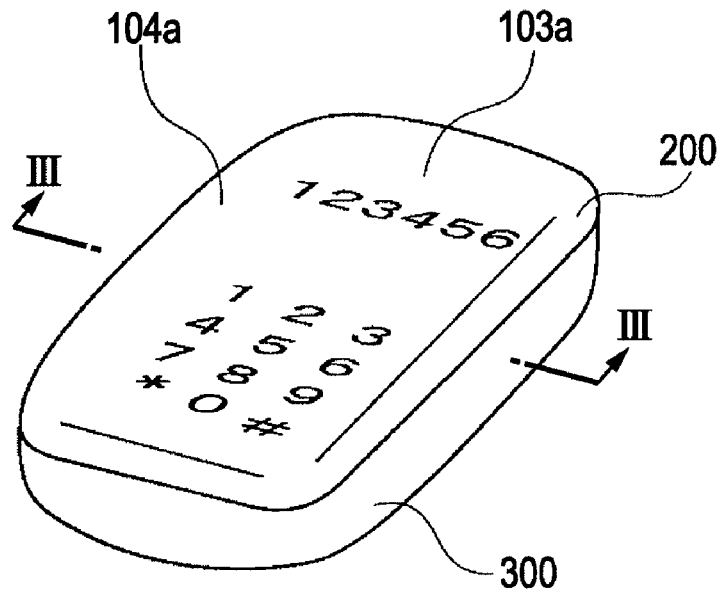
FIG. 2 is a perspective view illustrating an example of the portable wireless communication device according to the first embodiment of the present invention.
Figure 3:
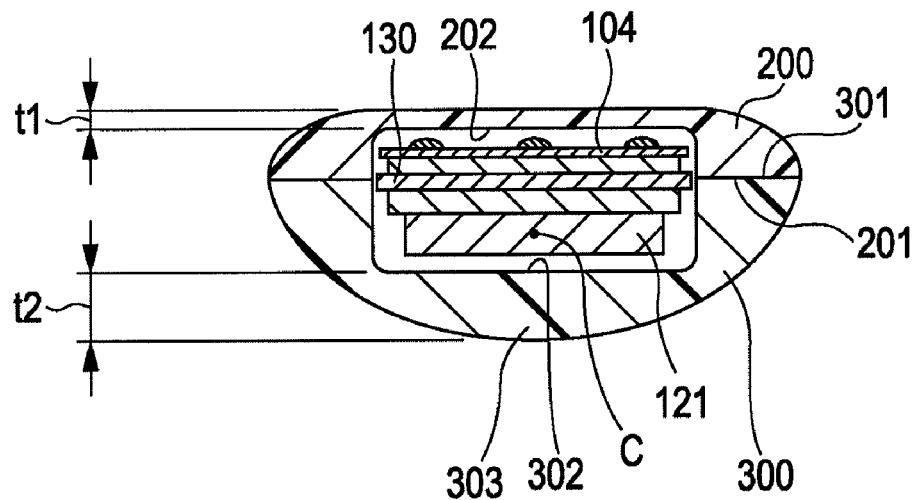
FIG. 3 is a sectional view taken along the line in FIG. 2.

FIG. 1 is a diagram illustrating by explosion a configuration of a portable telephone terminal device 100, FIG. 2 shows its assembled state, and FIG. 3 shows its section.

The exemplary portable telephone terminal device 100 according to this embodiment has a waterproof structure and further floats on water. For this reason, as shown in FIGS. 1 and 2, the portable telephone terminal device 100 has a configuration in which a board 130 where the respective components are installed is covered with a first case 200 and a second case 300 made of synthetic resin which has a waterproof characteristic and is relatively thick.

As shown in FIG. 1, components constituting a display portion 103 and an operation portion 104 are installed on a front face side of the board 130, and a secondary battery 121 and a charging only coil 122, etc. are arranged on a rear face thereof. In addition, an antenna 106 for a wireless telephone is arranged at a specific position (a corner in the lower side in the FIG. 1 example) in the front face side of the board 130. The arrangement position of the antenna 106 will be described later in detail. Although not shown in the drawing, other circuit components used for a portable telephone terminal, such as a wireless communication circuit described later, are also installed on the board 130.

The first case 200 and the second case 300 are made of soft synthetic resin which is relatively flexible and has a waterproof characteristic. For example, it is possible to use resin called elastomer resin or rubber, or the like. As shown in FIG. 1 or FIG. 3, the board 130 and the respective components arranged on the board 130 are housed in the space formed by a housing 202 of the first case 200 and a housing 302 of the second case 300.

The first case 200 and the second case 300 are joined, for example, by attaching a connection surface 201 of the first case 200 and a connection surface 301 of the second case 300 to each other. The attachment to each other may use any methods such as welding, adhesion or the like as long as the waterproof characteristic is secured.

Inside the first case 200 and the second case 300, at least a part of the first case 200 which is the front face is transparent, and characters, numbers or images displayed on the display portion 103 housed inside can be seen from the outside of the case 200. Also, the keys arranged as the operation portion 104 are seen from the outside of the case 200. Alternatively, as for the operation portion 104, numbers or functions indicating a position where the keys are arranged may be represented on the surface of the first case 200 by a printing or the like, and, in this case, the first case 200 may be opaque. A part of the first case 200 corresponding to the position where the display portion 103 is arranged may not be completely transparent so that characters or the like displayed due to light emitted from the display portion 103 are visible by transmission. The keys arranged as the operation portion 104 are worked by a user pressing them from on the case 200.

The second case 300 which is the rear face side of the terminal device 100 may not be transparent.

In this example, as shown in section in FIG. 3, the second case 300 which is the rear face side is relatively thick, and thus it is thicker than the first case 200. In detail, as shown in FIG. 3, the thickness t1 of the first case 200 corresponds to a thickness (for example, about several mm) where the case 200 can maintain the waterproof characteristic and further its intensity as a case, and the thickness t2 of the center portion of the second case 300 is significantly greater than the thickness t1 of the front face side. The second case 300 side has a shape where the center portion is thickly protuberant and the thickness gradually decreases towards both of the lateral sides.

As above, the case 300 of the rear face side is thick so as to increase its weight, and thereby a position of the center of gravity C in the entire portable telephone terminal device 100 lies in the rear face side so as to be deviated from the center position of the terminal device 100 as shown in FIG. 3. As a factor for determining the position of the center of gravity C, there may be an influence for arranging the respective components inside the cases as well as the cases 200 and 300; however, in this example, the thickened case 300 is a prime factor by which the position of the center of gravity C is slightly shifted to the rear face side.

[2. Description of an Internal Configuration of the Terminal Device According to the First Embodiment (FIG. 4)]

Figure 4:
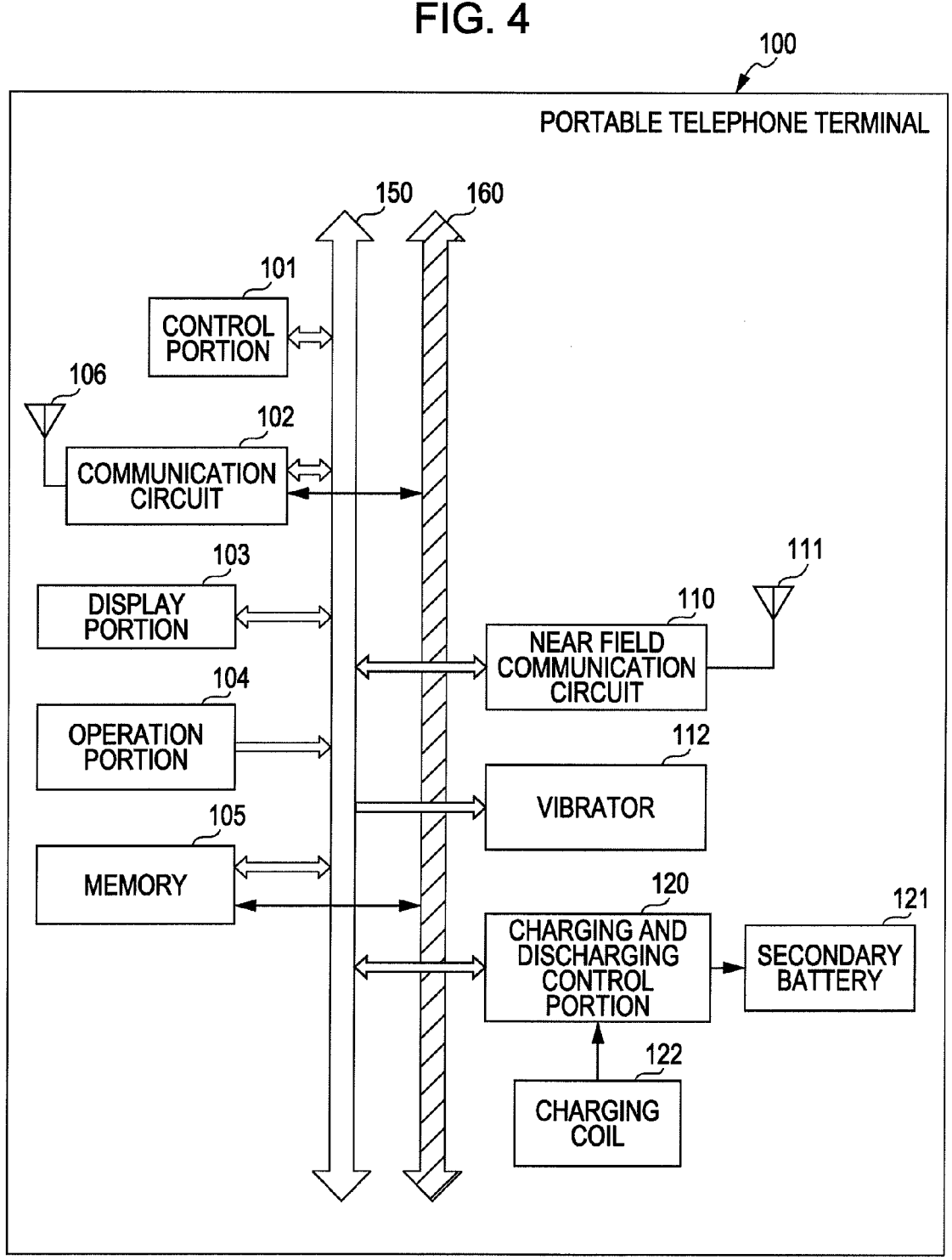
FIG. 4 is a block diagram exemplarily illustrating an internal configuration of a portable wireless communication device according to the first embodiment of the present invention.

FIG. 4 is a block diagram exemplarily illustrating an internal configuration of the portable telephone terminal device 100 according to this embodiment.

When describing the configuration shown in FIG. 4, the portable telephone terminal device 100 has a control portion 101 including a central processing unit (CPU), and the control portion 101 controls the respective portions via a control line 150. Separate from the control line 150, a data line 160 transmitting voice data and so on is provided. Operation instructions are sent to the control portion 101 from the operation portion 104. The operation portion 104 includes a board or the like provided with, for example, key switches.

Also, the portable telephone terminal device 100 includes a communication circuit 102 which performs wireless communication with a base station or the like as a portable telephone terminal, and the communication circuit 102 is connected to the antenna 106. Voice data in the data received by the communication circuit 102 is sent to a near field communication circuit 110 so as to be wirelessly transmitted from an antenna 111 connected to the near field communication circuit 110. The near field communication circuit 110 is a communication circuit based on, for example, a wireless communication method called Bluetooth (trademark), and receives and outputs the voice through a headset (not shown) for Bluetooth.

In addition, voice data wirelessly transmitted from the headset is received by the near field communication circuit 110, provided to the communication circuit 102 via the data line 160, and wirelessly transmitted to the base station. In this example, a microphone and a speaker constituting a handset is not installed in the terminal device 100.

When various pieces of data including mail data, data in a web browsing screen, downloaded image data or music data or the like are received by the communication circuit 102, these various pieces of data are stored in a memory 105 so as to perform an image display or a music reproduction.

There is provided a display portion 103 which performs image displays based on the received data, a display of a calling or a receiving in working as a portable telephone terminal, an address book display, or the like. The display portion 103 may adopt, for example, a liquid crystal display panel, an organic electro-luminescence display panel and the like.

This exemplary portable telephone terminal device 100 has a secondary battery 121 constituted by a lithium ion battery or the like, as a power supply. Charging and discharging of the secondary battery 121 is controlled by a charging and discharging control portion 120. Here, in this example, the terminal device 100 includes a charging coil 122 and does not include a terminal for use in charging.

The charging coil 122 is arranged in the rear face side of the portable telephone terminal device 100 as shown in FIG. 1 and so on, and is supplied with power from a charger (not shown) in the vicinity of a coil of the charger side so as to charge the secondary battery 121.

[3. Exemplary State Used According to the First Embodiment (FIGS. 5 and 6)]

Figure 5:
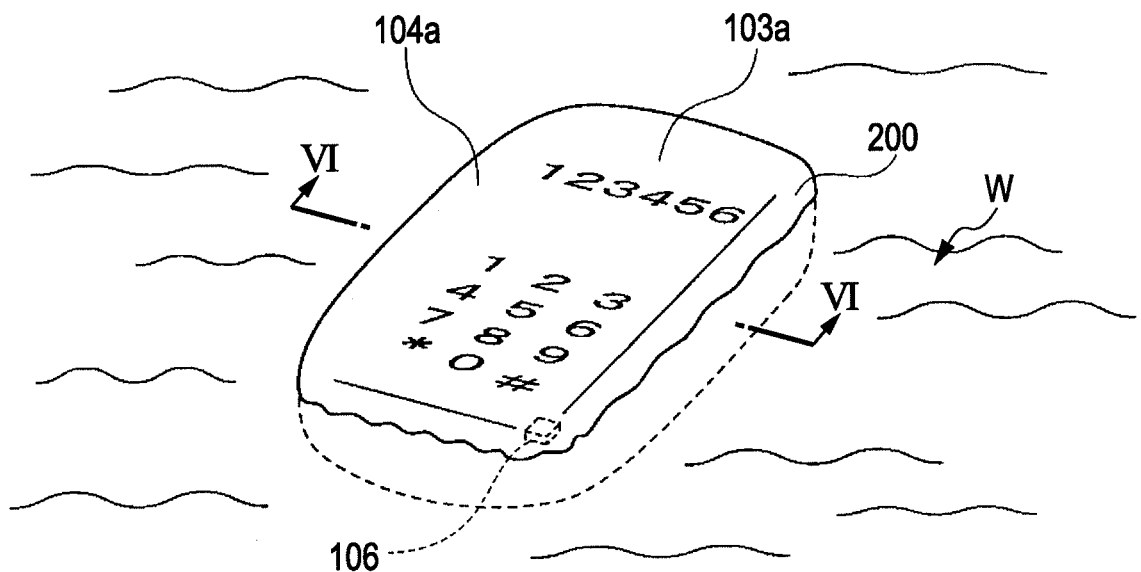
FIG. 5 is a diagram exemplarily illustrating a state where the portable wireless communication device according to the first embodiment of the present invention floats on water.

An example of states of using this exemplary portable telephone terminal device 100 will be described with reference to FIGS. 5 and 6. The portable telephone terminal device 100 in this example has the waterproof structure, and further the case structure which enables itself to float on water, as described above. For this reason, when the portable telephone terminal device 100 in this example is put under water, it floats on water as shown in FIG. 5. At this time, as described in FIG. 3, the rear side of the terminal device is heavy so that the position of the center of gravity in the terminal device is shifted to the rear side with respect to its center, and thus the rear side is downwards so that there is a high possibility that it floats on water.

FIG. 5 shows a state where the portable telephone terminal device 100 floats on a water surface W, where the key arrangement 104a constituting the operation portion 104 and the display 103a displayed on the display portion 103 are seen through the first case 200 which is the front face. As above, when this exemplary terminal device 100 is put under water, it floats so that the front face where the key arrangement and the display are seen is upwards, as shown in FIG. 5. Therefore, when it floats on water, an operation can be promptly performed in the state where the display on the display portion 103 can be seen and at the same time the key arrangement can also be seen. In detail, for example, when there has been an incoming call or an incoming mail to the portable telephone terminal device 100 in the state of floating on water, the incoming call or the incoming mail can be found promptly through the display on the display portion 103. The key arrangement 104a may be provided with an illumination system, and notification of the incoming call or the incoming mail may be made by lighting of the key arrangement 104a or the like.

Figure 6:
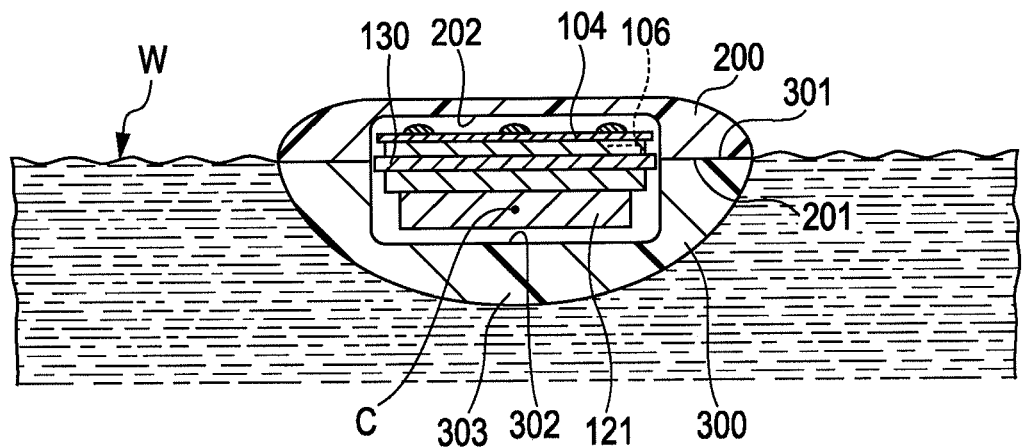
FIG. 6 is a sectional view taken along the line VI-VI in FIG. 5 by section.

In this exemplary portable telephone terminal device 100, as shown in FIG. 6, the antenna 106 installed on the internal board 130 is positioned higher than the water surface W when the terminal device 100 floats on water.

As above, the antenna 106 is positioned higher than the water surface W when floating on water, whereby the portable telephone terminal device 100 can perform good wireless communication with a radio base station, and perform a telephone call or transmission and reception of a mail, even in the state of floating on water. Further, this is the same for the antenna 111 on near field communication (here, a Bluetooth scheme) shown in FIG. 4, which may be arranged so that it is positioned higher than the water surface W when the terminal device 100 floats on water.

This exemplary portable telephone terminal device 100 does not include a microphone and a speaker constituting a handset in the terminal device body, and, in relation with charging, has a configuration where non-contact charging is made using the charging coil 122. Thereby, the waterproof structure where the inside is completely covered with the first case 200 and the second case 300 can be relatively simply formed. Therefore, the portable telephone terminal device 100 is suitable for use in the state where it floats on water as shown in FIG. 5.

As the cases in the example in FIG. 1, the first case 200 and the second case 300 are separate; however, a single case formed by joining the cases 200 and 300 is possible as long as a single body can be formed by any methods.

[4. Configuration of a Second Portable Telephone Terminal Device According to the First Embodiment (FIG. 7)]

Figure 7:
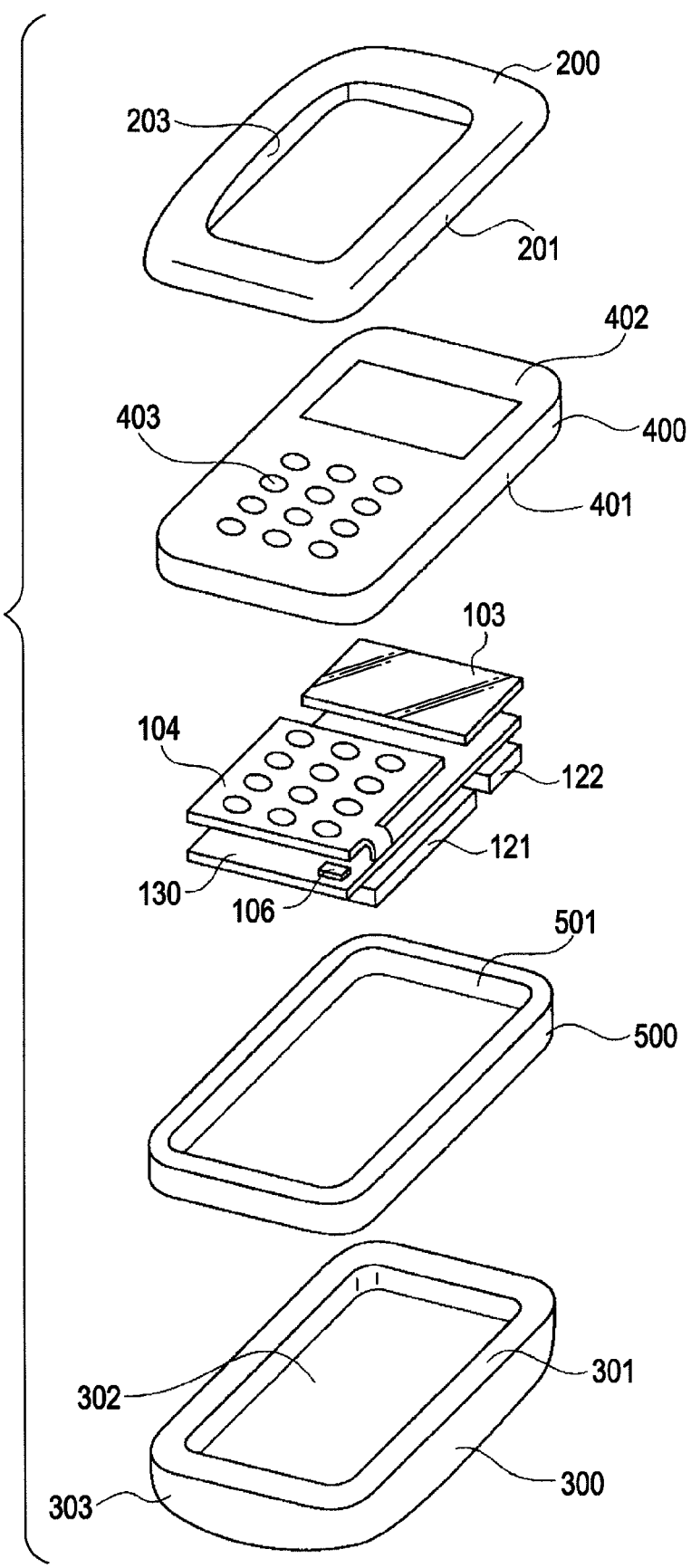
FIG. 7 is an exemplarily exploded perspective view illustrating by explosion a second portable wireless communication device according to the first embodiment of the present invention.

FIG. 7 is a diagram exemplarily illustrating by explosion a configuration of a portable telephone terminal device according to another embodiment of the present invention. In the example in shown FIG. 7, internal cases 400 and 500 are provided, in addition to the first case 200 and the second case 300 as a case. That is to say, the board 130 and the respective components on the board are housed in a space formed between a housing 401 in the internal case 400, made of hard resin, of the front face side, and a housing 501 in the internal case 500 of the rear face side. A window portion 402 corresponding to the display portion 103 and the keys 403 are arranged in the internal case 400 of the front face side. A window portion 203 is formed in the external first case 200, and the display portion 103 and the keys 403 are exposed from the window portion 203 in the assembled state. However, the waterproof structure can be maintained although the window portions 203 and 403 are formed.

The other portions are the same as those of the portable telephone terminal device 100 in the example in FIG. 1. In other words, the first case 200 and the second case 300 have flexibility, and the waterproof structure is achieved by the respective cases 200 to 500. In addition, the position of the center of gravity is shifted to the rear face side with respect to its center.

As shown in FIG. 7, the cases 200 and 300 cover the internal cases 400 and 500 after the board 130 and the respective components on the board are housed in the internal cases 400 and 500, and thereby the internal circuit components are protected by the internal cases 400 and 500. For this reason, when the external cases 200 and 300 have a form for giving the waterproof capability and shifting the position of the center of gravity, intensity and so on for the terminal device can be favorably improved as well. In addition, when it is difficult to form the window portions while maintaining the waterproof capability, it may be handled by making the associated portions of the respective cases transparent.

[5. Exemplary Third Portable Telephone Terminal Device According to the First Embodiment (FIG. 8)]

Figure 8:
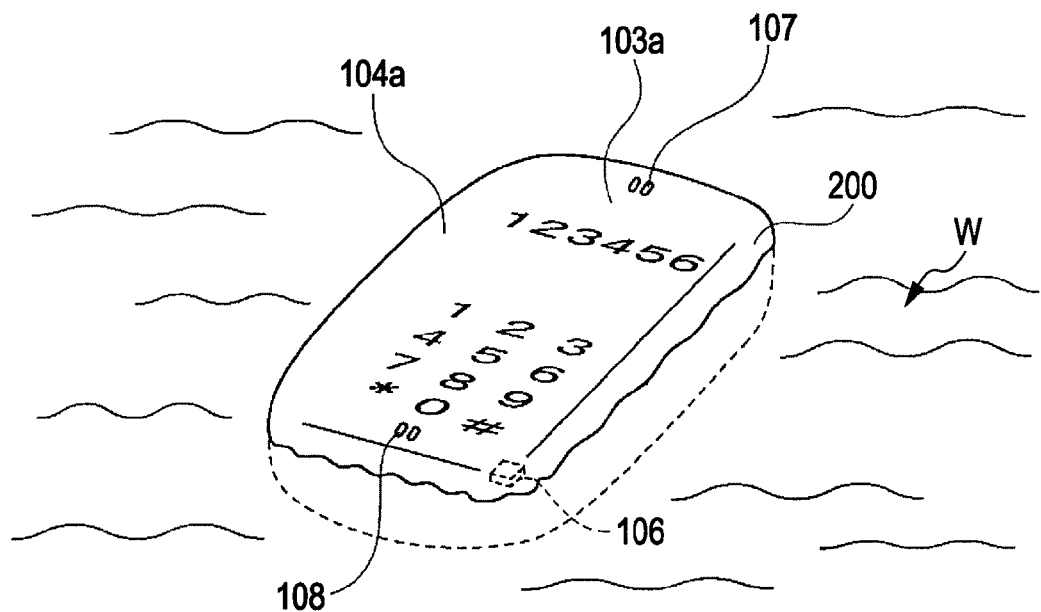
FIG. 8 is a diagram exemplarily illustrating a third portable wireless communication device according to the first embodiment of the present invention.

FIG. 8 is a diagram exemplarily illustrating a portable telephone terminal device according to another embodiment of the present invention. In the example in FIG. 8, a speaker 107 is arranged in the upper side of the front face of the first case 200 and a microphone 108 is arranged in the lower side of the front face thereof, and the speaker 107 and the microphone 108 function as a handset.

The waterproof structure can be maintained even when the speaker 107 and the microphone 108 are arranged in the case 200. The other portions are the same as the portable telephone terminal device 100 in the example in FIG. 1, and the position of the center of gravity is also positioned so as to be shifted to the rear face side with respect to its center.

In the configuration shown in FIG. 8, the speaker 107 and the microphone 108 are typically positioned higher than the water surface W in company with the display 103a and the key arrangement 104a, as the state of floating on the water surface W is shown in FIG. 8. Therefore, for example, a telephone call is possible in the state of floating on water as shown in FIG. 8, by embedding a hands-free communication function therein.

[6. Description of a Modification According to the First Embodiment (FIGS. 9 and 10)]

Figure 9:
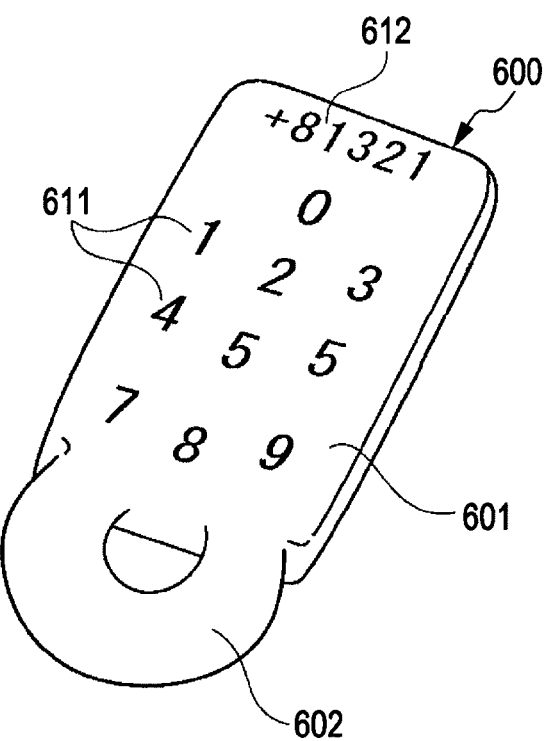
FIG. 9 is a perspective view exemplarily illustrating a modification (Example 1) of the portable wireless communication device according to the first embodiment of the present invention.
Figure 10:
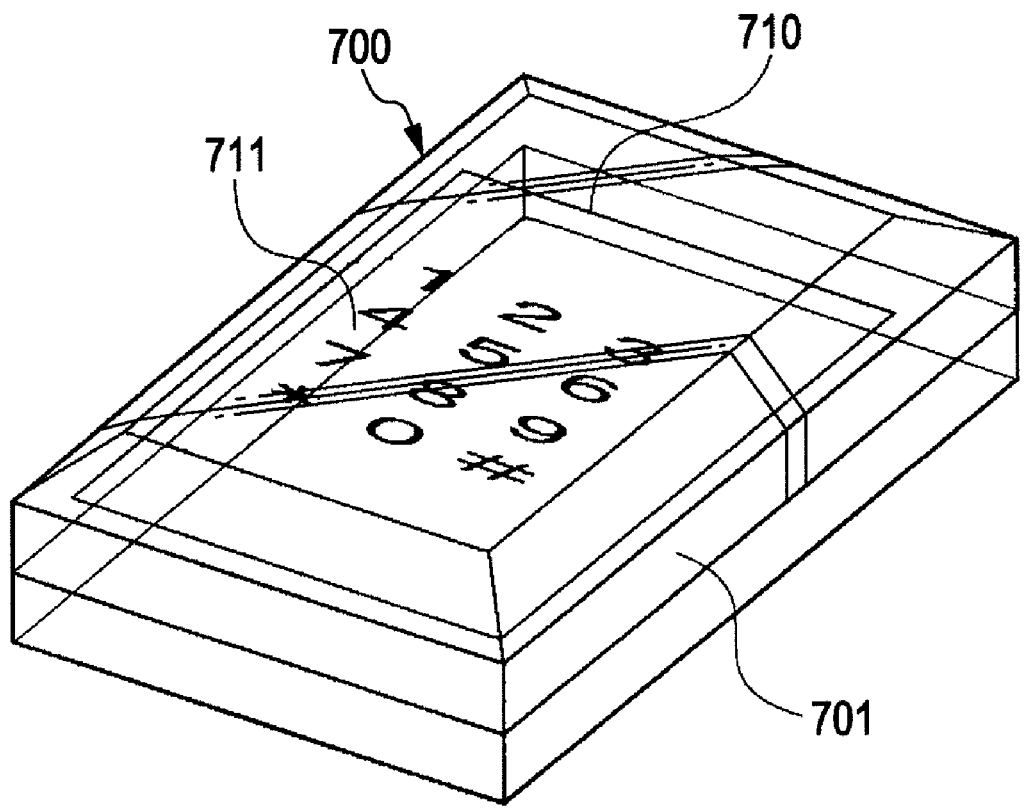
FIG. 10 is a perspective view exemplarily illustrating a modification (Example 2) of the portable wireless communication device according to the first embodiment of the present invention.

FIGS. 9 and 10 show examples where a shape of the portable telephone terminal device is modified.

The example in FIG. 9 shows a portable telephone terminal device 600 covered with a case 601 which has a waterproof structure and is made of flexible resin, and a ring portion 602 is formed with the case 601 as a single body. Keys 611 and a display portion 612 are seen from the front face of the case 601. Also, the position of the center of gravity is shifted to the rear face side with respect to its center.

In the configuration shown in FIG. 9 as well, the front face side having the keys 611 and the display portion 612 is upwards when floated on water.

FIG. 10 shows another example of a portable telephone terminal device 700. In this example, an entire case 701 is transparent and floats on water while having a waterproof form. Since the case is transparent, keys 711 and so on arranged on an internal board 710 can be seen. The keys 711 can be operated by being pressed from on the surface side of the case 701.

Likewise, as for the portable telephone terminal device 700 in this example shown in FIG. 10, the position of the center of gravity is shifted to the rear face side with respect to the center of the terminal device. However, the shift of the position of the center of gravity to the rear face side with respect to the center of the terminal device is made by arrangement of internal components, and the thickness of the case 701 is the same in the front face and the rear face.

In the configuration shown in FIG. 10 as well, the front face side having the keys 711 and the display portion 712 is upwards when floating on water.

The non-contact charging is performed by the charging coil in the configuration shown in FIG. 4; however, a terminal for use in charging may be provided.

[7. Configuration of a Portable Telephone Terminal Device According to a Second Embodiment (FIGS. 11 and 12)]

To begin with, a configuration of a wireless communication terminal device according to a second embodiment of the present invention will be described with reference to FIGS. 11 and 12. The example in this embodiment is applied to a portable telephone terminal device which performs wireless communication with a base station or the like to connect to a wireless telephone line.

Figure 11A:
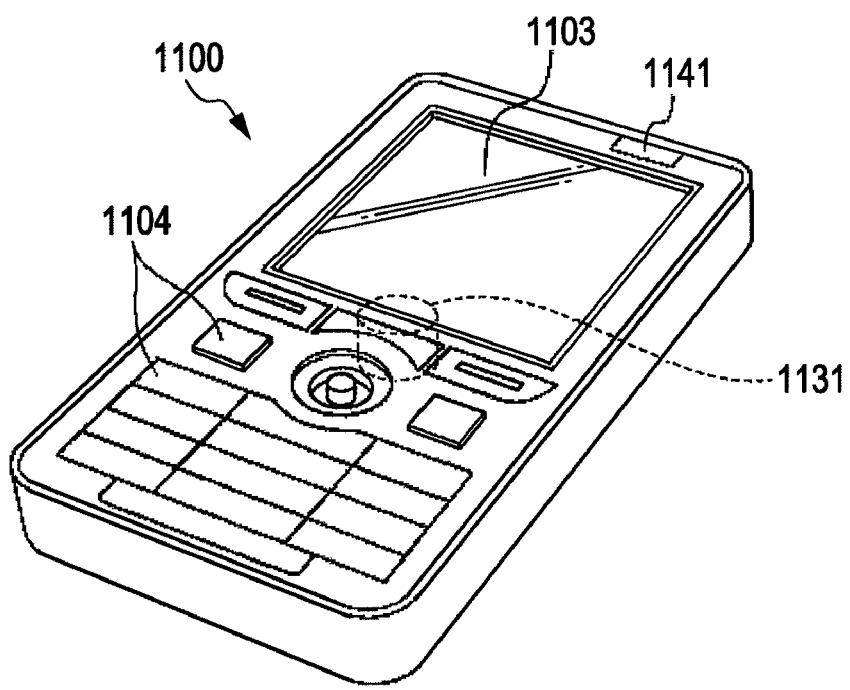
FIG. 11A shows its front face side and FIG. 11B shows its rear face side.
Figure 11B:
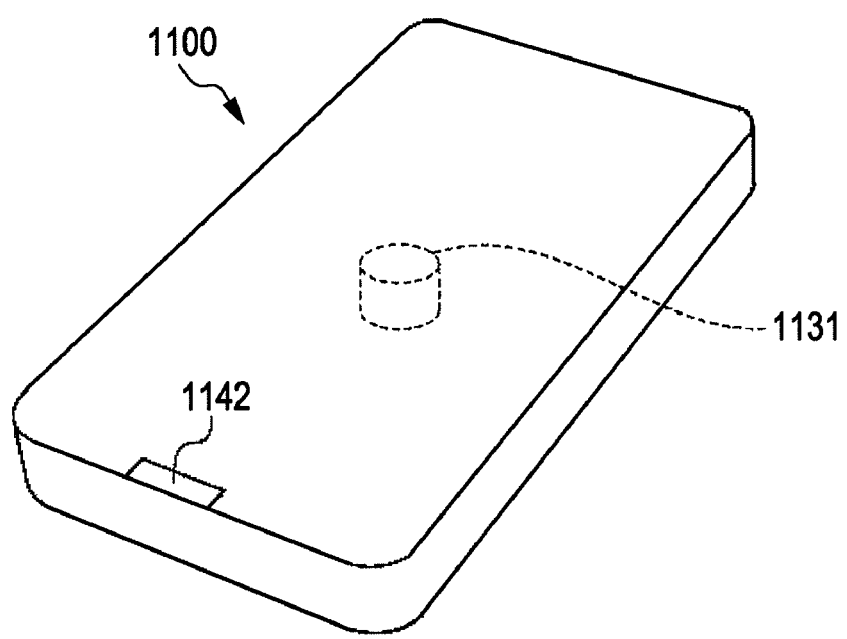

FIG. 11 shows a portable telephone terminal device 1100, in which FIG. 11A shows its front face side and FIG. 11B shows its rear face side. An exemplary portable telephone terminal device 1100 according to this embodiment has a waterproof structure and further floats on water. For this reason, cases of the portable telephone terminal device 1100 have a structure for waterproof. Here, although detailed description of the waterproof structure is omitted, various kinds of waterproof structures which have been applied to this kind of small-sized terminal device are applicable.

A display panel constituting a display portion 1103 is arranged in a front face of the portable telephone terminal device 1100 and displays characters, numbers, images or the like. A plurality of operation keys constituting an operation portion 1104 are arranged in the front face, and the operation keys are pressed to perform an operation as a telephone terminal. A first water detection sensor 1141 is arranged in the front face side of the portable telephone terminal device 1100, and a second water detection sensor 1142 is arranged in the rear face side thereof. The water detection sensor 1141 is a sensor which detects that the terminal device 1100 floats on water, and there can be application of various kinds of sensors, for example, a sensor detecting a pressure of water, a sensor detecting reflection from a water surface, and the like. The sensors 1141 and 1142 are arranged in both of the front face and the rear face as shown in FIG. 11, and thus the detection can be made even if any face floats upwards.

Figure 12:
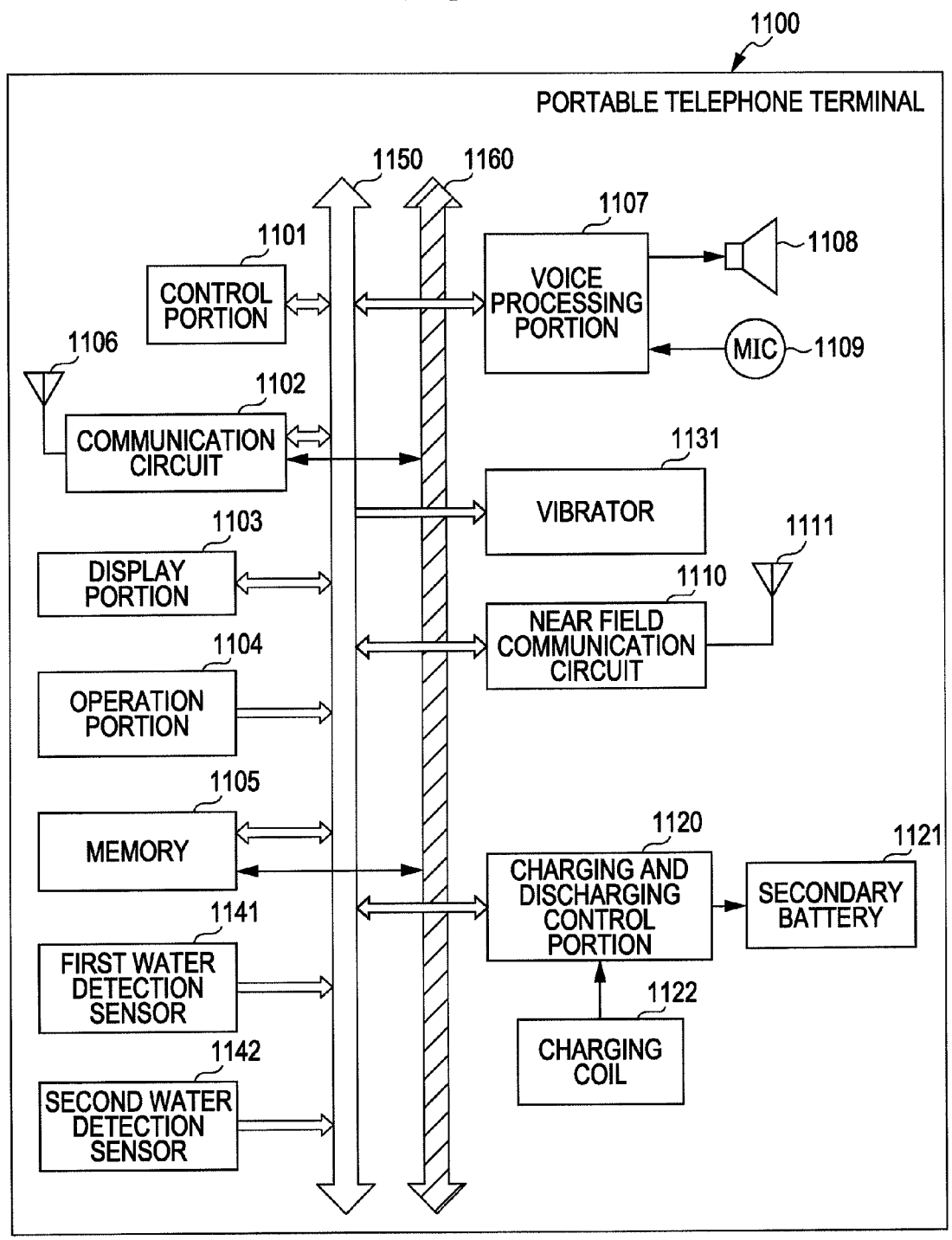
FIG. 12 is a block diagram exemplarily illustrating an internal configuration of the portable wireless communication device according to the second embodiment of the present invention.

FIG. 12 is a block diagram exemplarily illustrating an internal configuration of the portable telephone terminal device 1100 according to this embodiment.

If describing a configuration shown in FIG. 12, the portable telephone terminal device 1100 has a control portion 1101 including a central processing unit (CPU), and the control portion 1101 controls the respective portions via a control line 1150. Data (programs) used for control is stored in a memory 1105. An operation when an on-water mode described later is set is also set based on this program stored in the memory 1105.

Also, separate from the control line 1150, a data line 1160 transmitting voice data and so on is provided. Operation instructions are sent to the control portion 1101 from the operation portion 1104. The operation portion 1104 includes buttons constituting operation keys and a board or the like provided with key switches which are changed each time the buttons are pressed.

Also, the portable telephone terminal device 1100 includes a communication circuit 1102 which performs wireless communication with a base station or the like as a portable telephone terminal, and the communication circuit 1102 is connected to the antenna 1106. Voice data in the data received by the communication circuit 1102 is sent to a voice processing circuit 1107 so as to be demodulated, and the demodulated analog voice signal is sent to the speaker 1108 for output. Further, a voice signal picked up by a microphone 1109 is sent to the voice processing circuit 1107 so as to be modulated for transmission, and the modulated voice data is sent to the communication circuit 1102 for wireless transmission to a base station side.

The portable telephone terminal device 1100 includes a near field communication circuit 1110. The near field communication circuit 1110 is connected to an antenna 1111. This near field communication circuit 1110 is a communication circuit based on, for example, a wireless communication method called Bluetooth (trademark), and communicates with a headset (not shown) for Bluetooth or the like.

When various pieces of data including mail data, data in a web browsing screen, downloaded image data or music data or the like are received by the communication circuit 1102, these various pieces of data are stored in a memory 1105 so as to perform an image display or a music reproduction.

There is provided a display portion 1103 which displays images based on the received data, a calling or a receiving in working as a portable telephone terminal, an address book, or the like. The display portion 1103 may adopt various kinds of display panels, for example, a liquid crystal display panel, an organic electro-luminescence display panel and the like.

This exemplary portable telephone terminal device 1100 has a secondary battery 1121 constituted by a lithium ion battery or the like, as a power supply. Charging and discharging of the secondary battery 1121 is controlled by a charging and discharging control portion 1120. Here, in this example, the terminal device 1100 includes a charging coil 1122, and charging can be performed in the non-contact manner.

The charging coil 1122 is arranged in the rear face side of the portable telephone terminal device 1100, and is supplied with power from a charger (not shown) in the vicinity of a coil of the charger side so as to charge the secondary battery 1121.

This exemplary portable telephone terminal device 1100 includes a vibrator 1131 and vibrates the portable telephone terminal device 1100 itself at the time of receiving a call or a mail. The vibrator 1131 is vibrated based on a driving signal sent from the control portion 1101. A vibration state may adopt any type including a reciprocating vibration type, or a circular vibration type caused by installing a weight under eccentricity of a rotation member, or the like.

The first water detection sensor 1141 and the second water detection sensor 1142 described above are arranged, and the control portion 1101 determines a detection output from each thereof.

[8. Control Mode Setting for the Portable Telephone Terminal Device According to the Second Embodiment (FIG. 13)]

Next, operation modes set by the control portion 1101 based on the detection output from each of the water detection sensors 1141 and 1142 will be described. Herein, as an operation mode, there are prepared two modes such as a normal mode where the terminal device works as a general portable telephone terminal and an underwater mode suitable for use under water (or on water).

For example, when the portable telephone terminal device 1100 is powered on, the control portion 1101 periodically monitors detection states of two water detection sensors 1141 and 1142. The control portion 1101 determines whether or not the first water detection sensor 1141 detects water (step S11). If water is determined not to be detected, it is determined whether or not the second water detection sensor 1142 detects water (step S12). When any one of the water detection sensors 1141 and 1142 detects water, the control portion 1101 sets the underwater mode (step S13). A processing state at the time of the underwater mode will be described later.

In the state where the underwater mode is set, it is determined whether or not both of the water detection sensors 1141 and 1142 detect water (step S14), and the underwater mode at step S13 is maintained as long as water is continuously detected.

When water is determined not to be detected at step S14, the process goes to step S15 so that the normal mode is set. In addition, when the second water detection sensor 1142 does not also detect water at step S12, the process goes to step S15 so that the normal mode is set. Thereafter, the determination is made at step S11.

The modes are set in this way, and thereby the terminal device 1100 is set to the underwater mode only when it is placed on water or under water.

Exemplary operations when the underwater mode is set will be described.

Operations in the underwater mode may include the following respective examples.

EXAMPLE 1

A processing state in the voice processing circuit 1107 is assumed to be in a state suitable for output under water or on water. In detail, for example, it is assumed that a voice output from the speaker 1108 is made relatively large and a voice easily travels under water or on water. In addition, for example, a sensitivity of the microphone 1109 is set to that easy to pick up a voice under water or on water. The output state or the sensitivity thereof may be set to a predefined value in the underwater mode. In the normal mode, these settings are set to a value adjusted freely by a user.

A sound for notification of an incoming call or an incoming mail is set to different sounds (melody or the like) in the normal mode and the underwater mode.

EXAMPLE 2

A display state in the display portion 1103 is set to a state suitable for output under water or on water. In detail, for example, a display size is controlled so that the display is easily recognized under water or on water as well, and thereby a relatively large character or image is displayed. In addition, for example, a light-emission luminance of a backlight or a light-emission luminance of a display element is controlled so that the display state is easily recognized under water or on water. In the normal mode, the display size or the display luminance thereof is set by a user, and, in the underwater mode, it is set to a fixed value suitable for underwater.

EXAMPLE 3

Although not shown in the configuration in FIG. 12, an illumination mechanism such as a lamp or the like which notifies of an incoming call, etc. is provided in the terminal device 1100, and when there is an incoming call or an incoming mail, a lighting color or a flickering pattern of the lamp is made to be changed in the underwater mode and in the normal mode. In the underwater mode, the lighting color or the flickering pattern is set so as to be considerably recognized.

EXAMPLE 4

A vibration pattern or an output of the vibrator 1131 which notifies of an incoming call or an incoming mail by vibration is changed in the underwater mode so as to be different from a vibration pattern in the normal mode. In detail, in the state where the terminal device 1100 floats on water, a vibration of the terminal device 1100 itself generates specific ripples on water to notify of the incoming call or the like.

In the normal mode, the terminal device 1100 itself is vibrated by a vibration pattern or an output suitable for notifying a user carrying the terminal device of the incoming call.

[9. Exemplary Operation in the State of Floating on Water According to the Second Embodiment (FIGS. 14 and 15)]

Here, examples when the vibration pattern or the output of the vibrator 1131 in the Example 4 is changed will be described with reference to FIGS. 14 and 15.

Figure 14A:
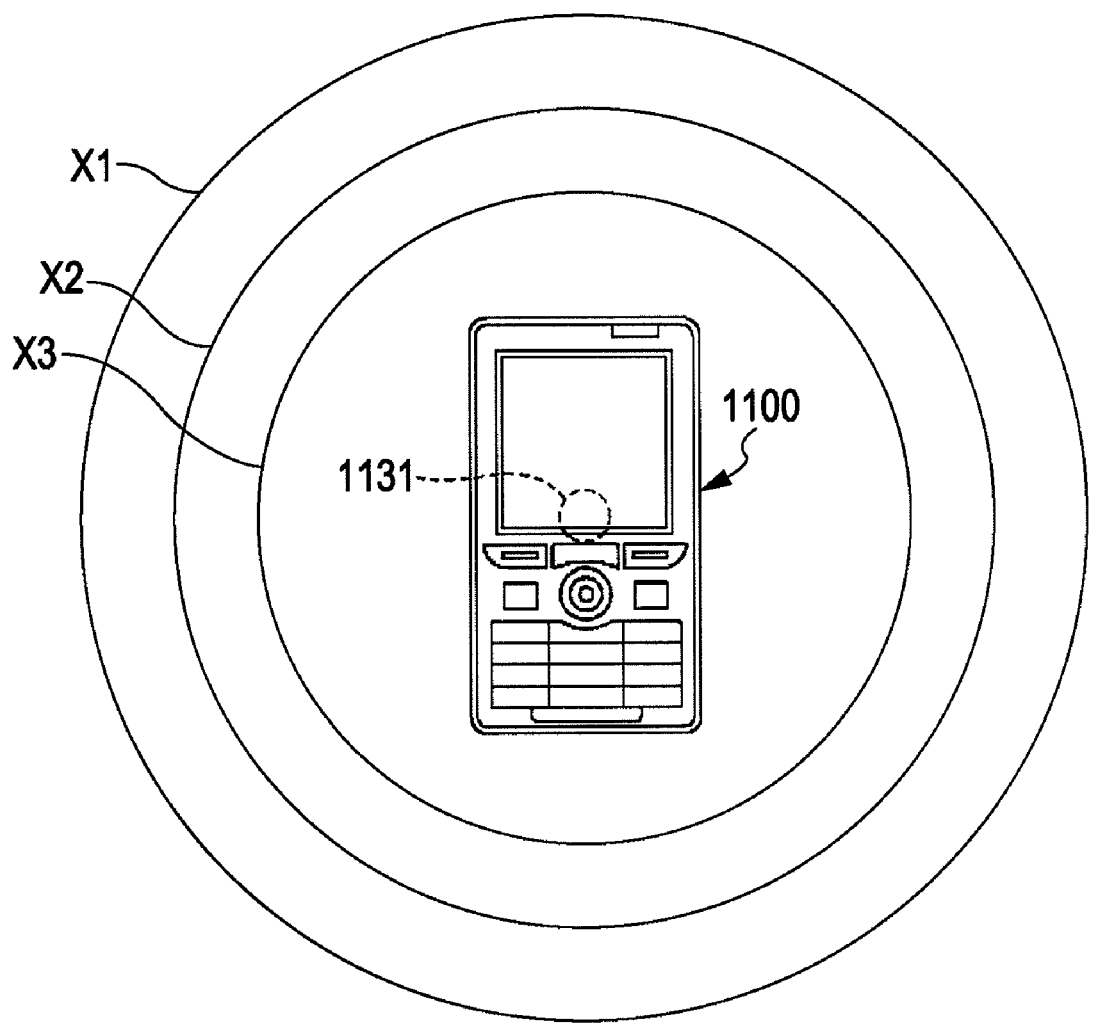
FIG. 14A is a diagram exemplarily illustrating ripples (Example 1) generated when the portable wireless communication device according to the second embodiment of the present invention is vibrated.
Figure 14B:
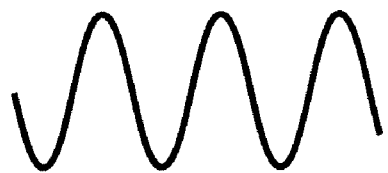
FIG. 14B shows a waveform generated by a vibrator.

The example in FIG. 14 shows a state where the vibrator 1131 is continuously driven at a constant state. FIG. 14B shows a waveform generated by the vibration of the vibrator 1131 which is continuously driven. The driving output is an output enough to generate ripples on water when the terminal device 1100 floats on water.

The vibrator 1131 is driven in this way, and thereby the ripples X1, X2 and X3, which are propagated in a concentric circle with respect to the portable telephone terminal device 1100 floating on water, are continuously generated as shown in FIG. 14A. In this example, the respective ripples X1, X2 and X3 are generated at a relatively short interval.

Figure 15A:
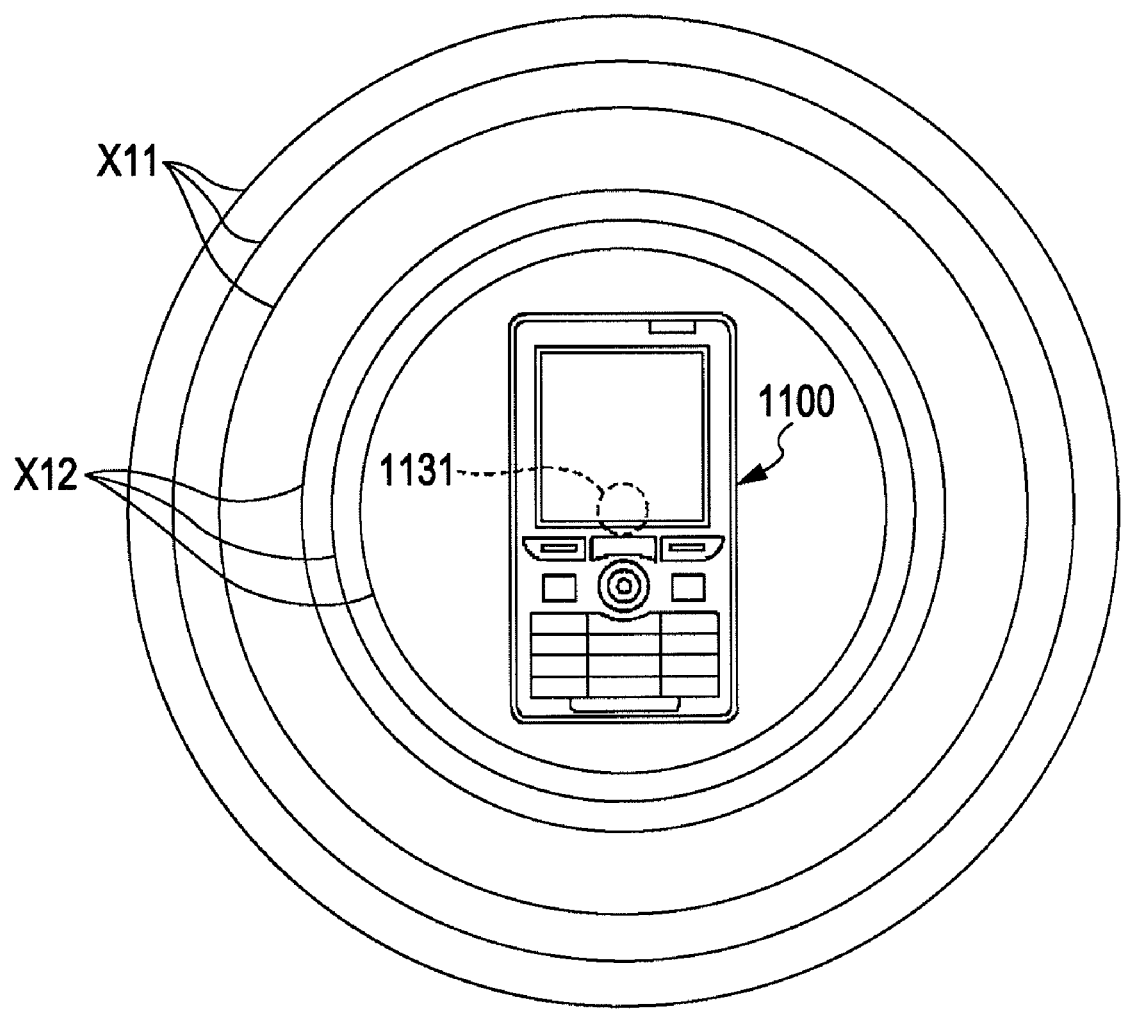
FIG. 15A is a diagram exemplarily illustrating ripples (Example 2) generated when the portable wireless communication device according to the second embodiment of the present invention is vibrated.
Figure 15B:
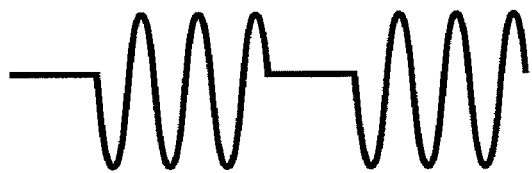
FIG. 15B shows a waveform generated by a vibrator.

FIG. 15 shows another example of the generation of ripples. The example in FIG. 15 shows a state where the vibrator 1131 is driven intermittently. FIG. 15B shows a waveform generated by the vibration of the vibrator 1131 which is driven alternately in a continuous movement state and in a stopping state. The driving output is an output enough to generate ripples on water when the terminal device 1100 floats on water.

The vibrator 1131 is driven in this way, and thereby the ripples X11 and X12, which are propagated in a concentric circle with respect to the portable telephone terminal device 1100 floating on water, are continuously generated at a constant interval, as shown in FIG. 15A.

One of the driving state shown in FIG. 14A and the driving state shown in FIG. 15A may be selected in the underwater mode; however, the control portion 1101 may select one thereof in the automatic manner, according to a notified state in the underwater mode. For example, notification of an incoming call is sent by the pattern in FIG. 14, and notification of an incoming mail is sent by the pattern in FIG. 15.

As described above, according to this exemplary portable telephone terminal device 1100, when the terminal device floats on water or under water, this is detected by the sensors 1141 and 1142 so that the operation mode is automatically changed to the associated mode. Therefore, a user does not make any action, and the terminal device is automatically changed to a state easy to be used under water or on water, whereby it lies in an optimum operation mode under water or in any circumstance other than underwater.

Figure 13:
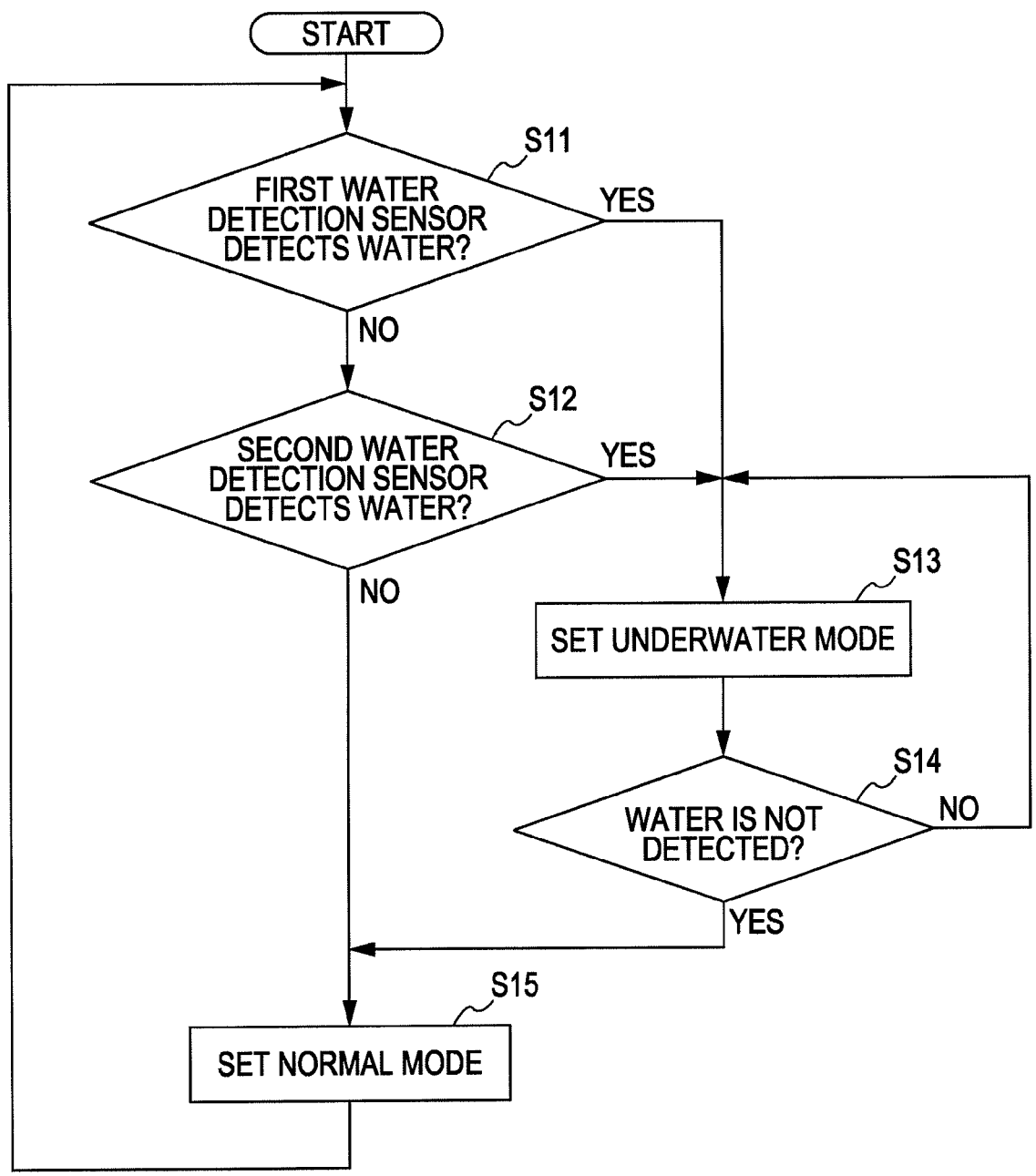
FIG. 13 is a flowchart exemplarily illustrating setting of operation modes in the portable wireless communication device according to the second embodiment of the present invention.

Although the underwater mode is automatically set according to the detection output of the sensors 1141 and 1142 in the flowchart in FIG. 13, the sensors 1141 and 1142 are not provided in the terminal device 1100, and, instead thereof, a user may select the underwater mode or the normal mode. In this case, for example, items for selecting the modes may be provided in a menu screen displayed on the display portion 1103. Alternatively, a dedicated operation key for switching the underwater mode on or off may be provided.

[10. Configuration of a Portable Telephone Terminal Device According to a Third Embodiment (FIGS. 16 and 17)]

Next, an exemplary third embodiment of the present invention will be described with reference to FIGS. 16 to 22.

Examples in this embodiment are applied to a portable telephone terminal device. In FIG. 16 and thereafter, the same reference numerals are given to the portions corresponding to FIGS. 11 to 15 described in relation with the examples in the second embodiment. This embodiment is different to the other embodiments in that shape of the terminal device and thus an internal configuration of the terminal device is fundamentally the same as that of the terminal device 1100 shown in FIG. 12.

Figure 16A:
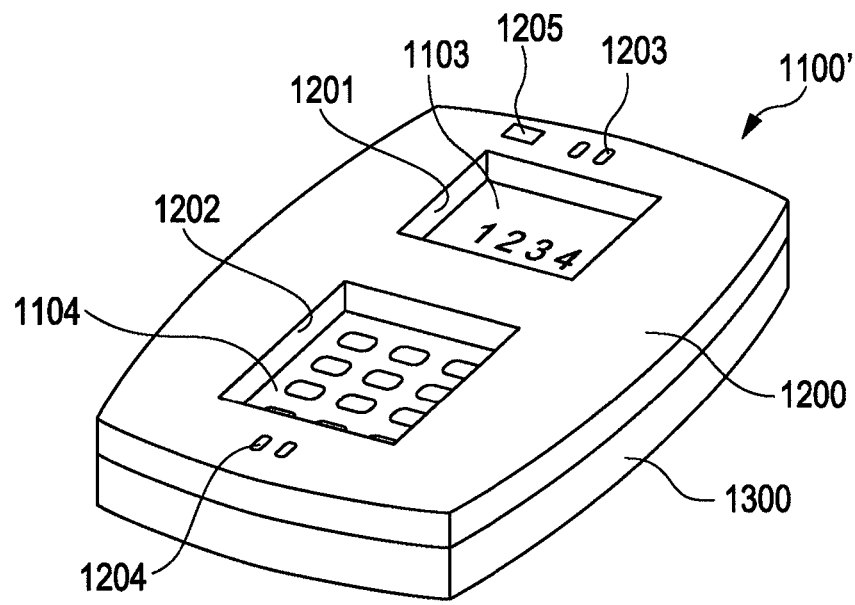
FIG. 16A shows a front face side and FIG. 16B shows a rear face side.
Figure 16B:
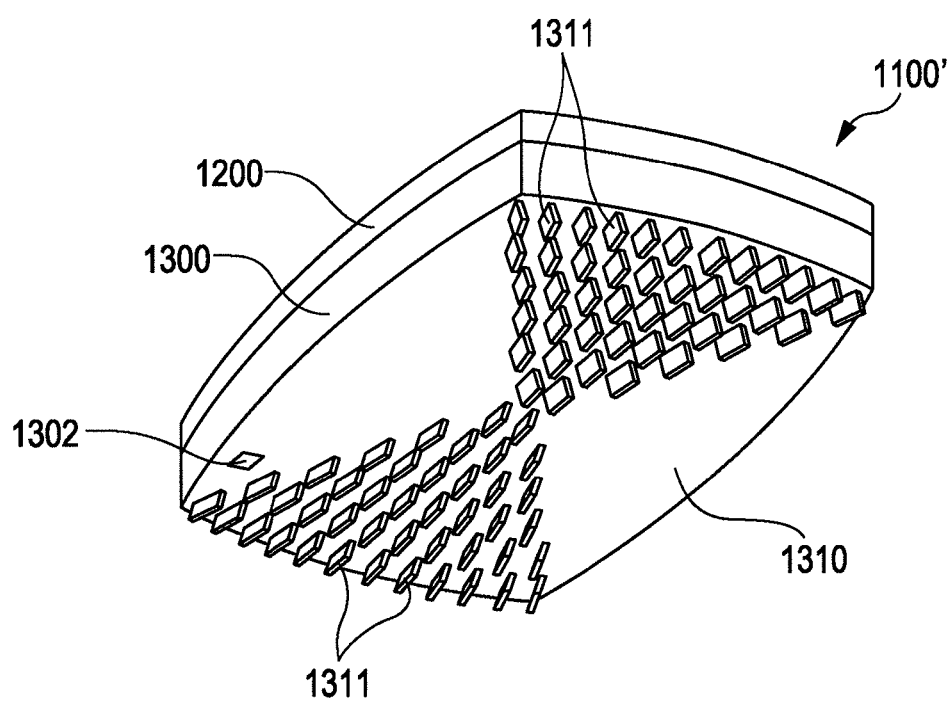

FIG. 16 is a diagram illustrating a shape of a portable telephone terminal device 1100' according to an example of this embodiment, in which FIG. 16A shows a front face side and FIG. 16B shows a rear face side. The portable telephone terminal device 1100' in the example of this embodiment has also the waterproof structure and floats on water. For this reason, cases of the portable telephone terminal device 1100' have a structure for waterproof. In other words, the portable telephone terminal device 1100' has a shape where a first case 1200 and a second case 1300 are joined.

As shown in FIG. 16A, a display panel constituting a display portion 1103 is arranged in a front face of the portable telephone terminal device 1100' and displays characters, numbers, images or the like. A plurality of operation keys constituting an operation portion 1104 are arranged in the front face, and the operation keys are pressed to perform an operation as a telephone terminal. Window portions 1201 and 1202 are formed on the front face of the case, corresponding to the display portion 1103 and the operation portion 1104. The waterproof characteristic may be secured not by opening the window portions 1201 and 1202 but by covering them with a transparent member.

There are provided a speaker arrangement portion 1203, a microphone arrangement portion 1204 and a sensor arrangement portion 1205 on the front face of the case 1200. The speaker 1108 shown in FIG. 12 is arranged in the speaker arrangement portion 1203. The microphone 1109 shown in FIG. 12 is arranged in the microphone arrangement portion 1204. The first water detection sensor 1141 is arranged in the sensor arrangement portion 1205.

As shown in FIG. 16B, a plurality of fins 1311 which are convex members are arranged on the rear face of the portable telephone terminal device 1100'. Also, a sensor arrangement portion 1302 is provided on the rear face, and the second water detection sensor 1142 is arranged therein.

In the plurality of fins 1311 formed on the rear face, the protruding members are arranged tilted, and the tilted directions of one and the other are opposite to each other with respect to its center therebetween.

Figure 17:
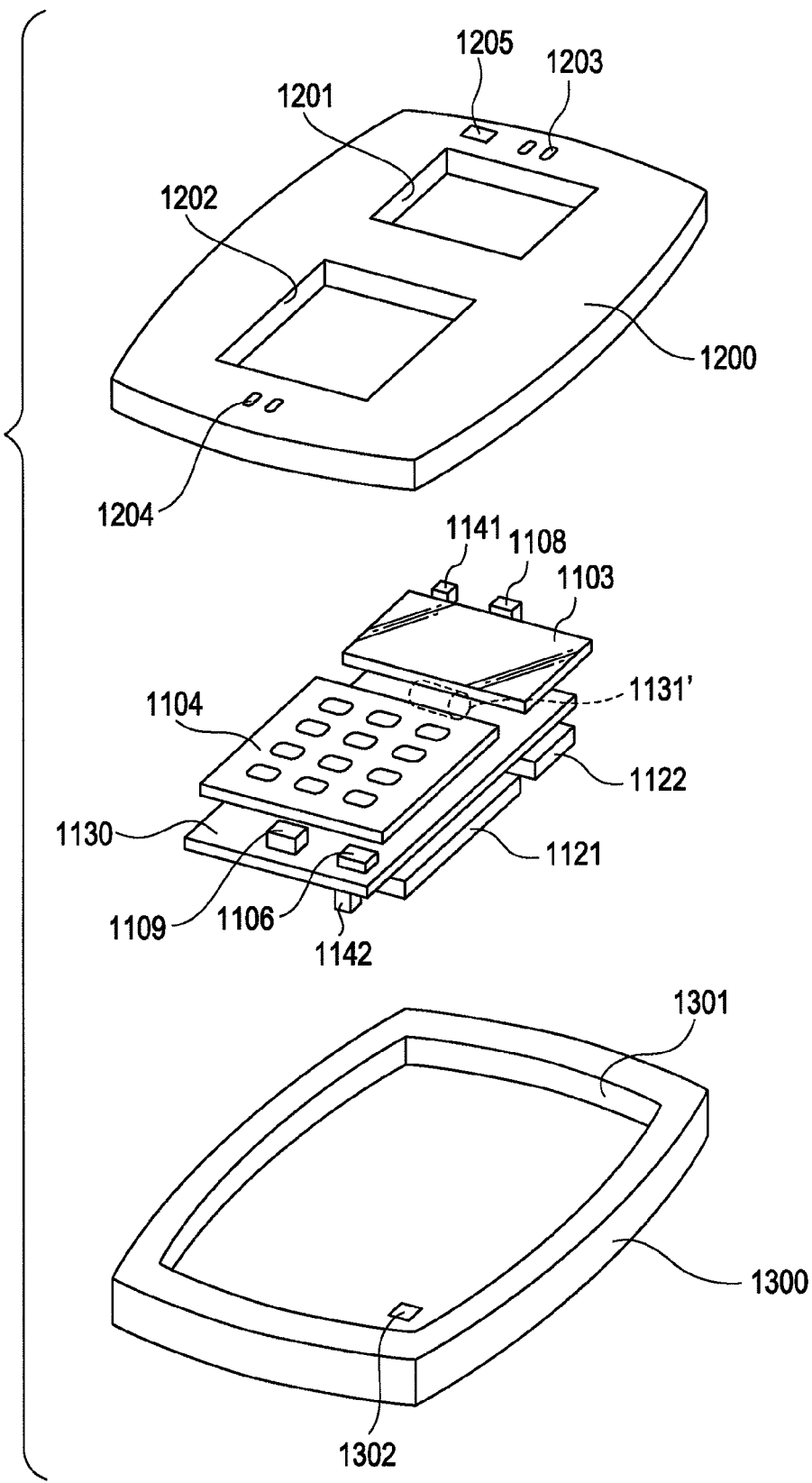
FIG. 17 is an exploded perspective view illustrating by explosion the portable wireless communication device shown in the example in FIG. 16.

FIG. 17 is an exploded view of the portable telephone terminal device 1100'. The board 1130 is provided with the respective components such as the display portions 1103, the operation portion 1104 and so on shown in FIG. 12, and the board 1130 and the portions thereon can be assembled to be waterproof in the state where they are housed in the housing 1301 between the first case 1200 and the second case 1300. A vibrator 1131' is installed on the board 1130.

In this exemplary portable telephone terminal device 1100' as well, the normal mode and the underwater mode (on-water mode) is set automatically or by a user's operation, based on the detection output or the like of the sensors 1141 and 1142.

[1. Operation in the State of Floating on Water According to the Third Embodiment (FIGS. 18 to 22)]

An exemplary operation when the portable telephone terminal device 1100' according to this embodiment is set to the underwater mode and floats on water will be described.

Figure 18:
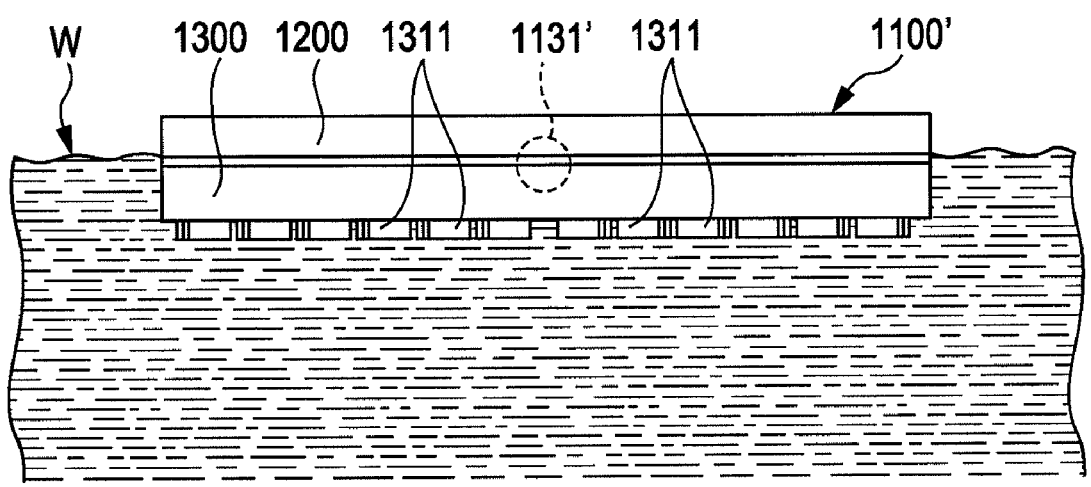
FIG. 18 is a diagram exemplarily illustrating a state where the portable wireless communication device according to the third embodiment of the present invention floats on water.

As shown in FIG. 18, this exemplary portable telephone terminal device 1100' floats on a water surface W while the rear face side where the fins 1311 are formed are under water. In order for the rear face side to be downwards, for example, a position of the center of gravity of the portable telephone terminal device 1100' may be made to lie in the vicinity of the rear face side; however, a user may make it float with a hand so that the state shown in FIG. 18 appears.

Figure 19A:
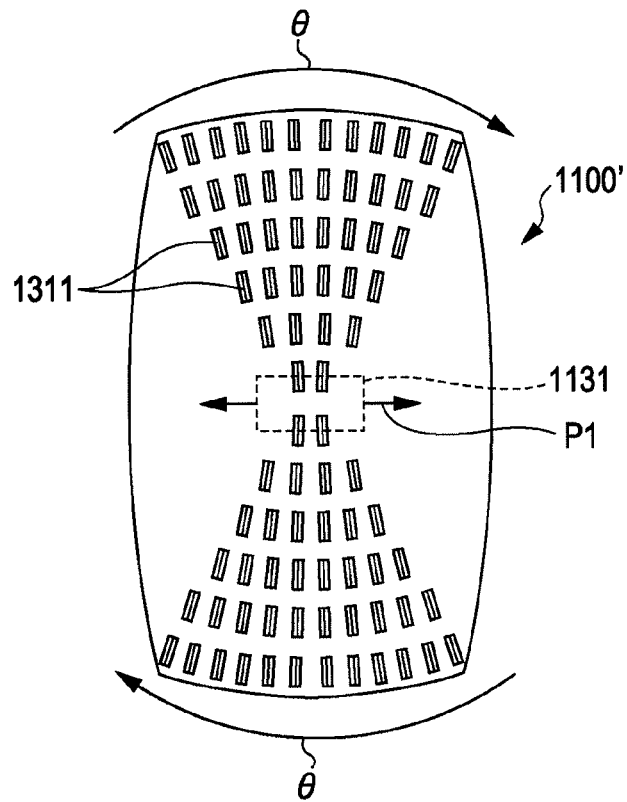
FIG. 19A shows a state before the motion and FIG. 19B shows a state after the motion.
Figure 19B:
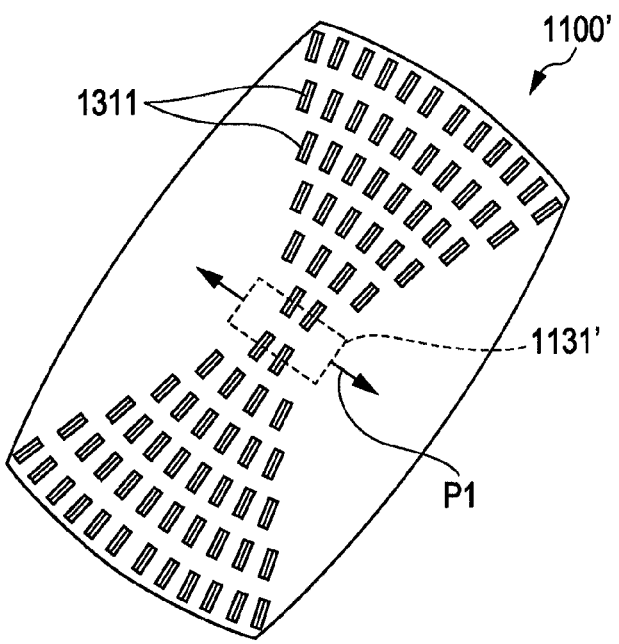

In this example, as shown in FIG. 19, the vibrator 1131' is arranged so that its force P1 (see FIG. 19) extends in the transverse direction. The fins 1311 are arranged so that directions of one set and the other set are opposite to each other with respect to the center of the rear face, and thereby the vibration of the vibrator 1131' enables the terminal device to be rotated in the rotation direction θ in FIG. 19A and to be placed at the tilted position as shown in FIG. 19B. In the underwater mode, the vibrator 1131' causing this motion vibrates to rotate the terminal device 1100', and thereby, for example, an incoming call or an incoming mail can be found from the motion of the terminal device itself on water.

Figure 20:
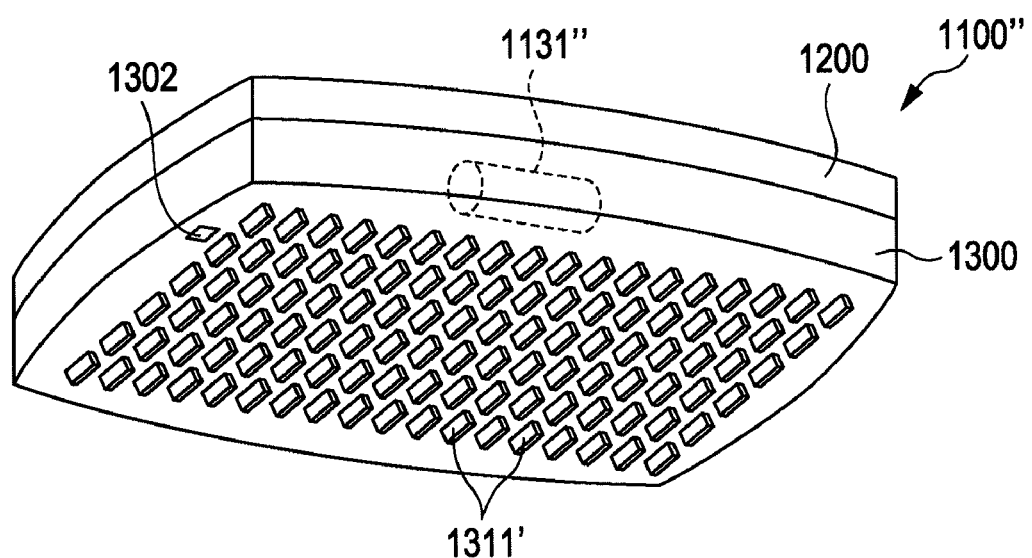
FIG. 20 is a perspective view exemplarily illustrating a modification of the portable wireless communication device according to the third embodiment of the present invention.
Figure 21:
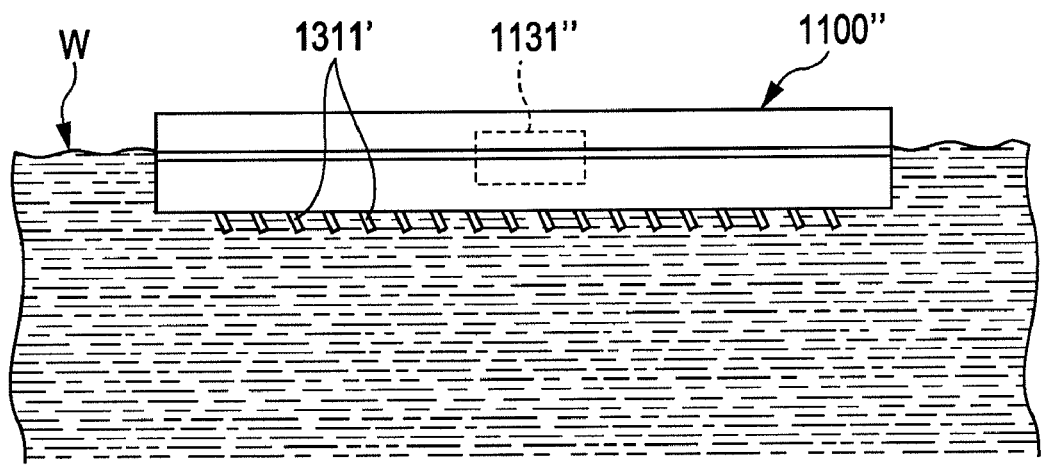
FIG. 21 is a diagram exemplarily illustrating a state where the portable wireless communication device shown in the example in FIG. 20 floats on water.
Figure 22:
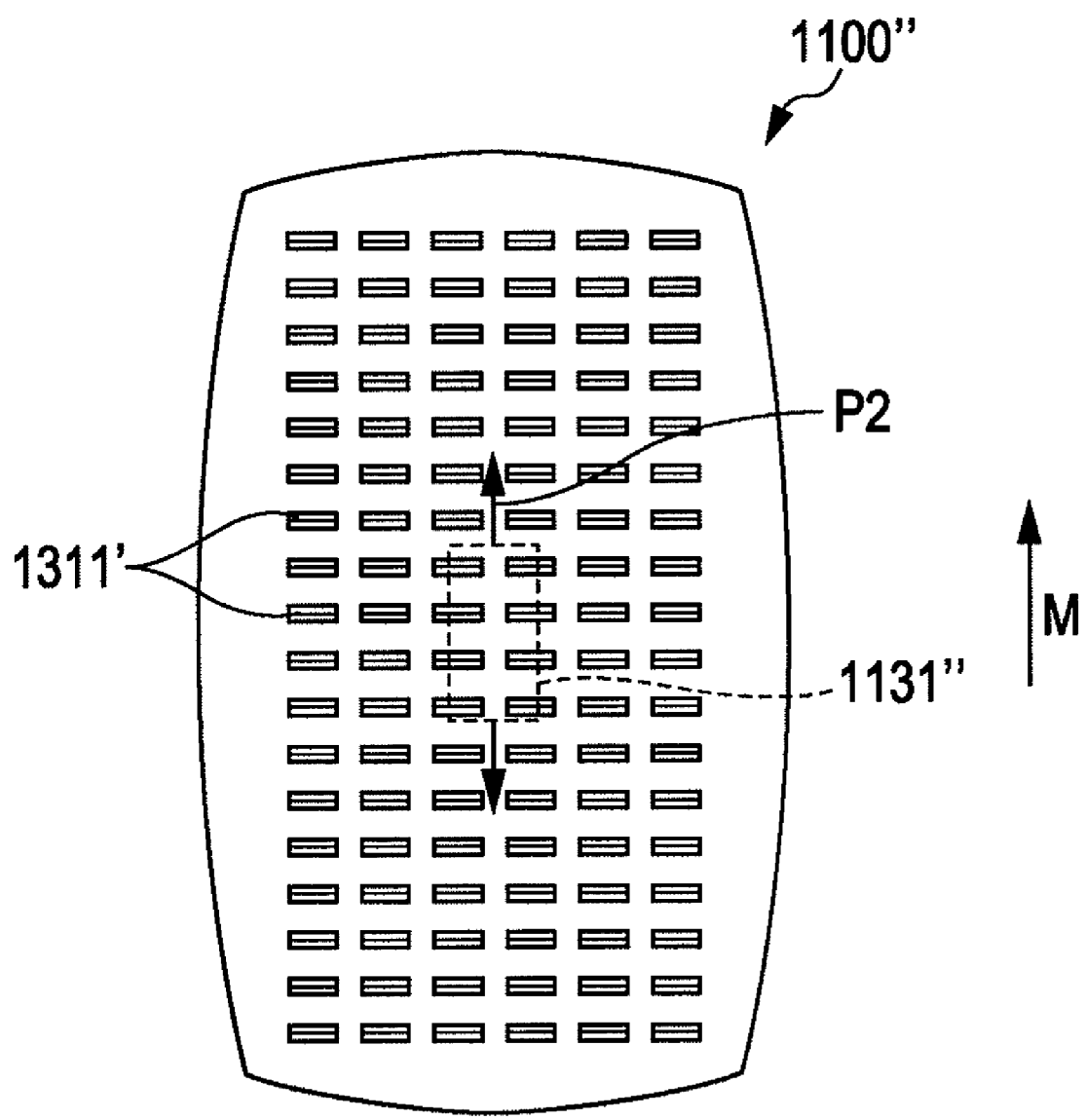
FIG. 22 is a diagram exemplarily illustrating where the portable wireless communication device shown in the example in FIG. 20 moves on water.

FIGS. 20 to 22 show a modification of the third embodiment.

In this example, as shown in FIG. 20, a plurality of fins 1311' are formed on a rear face of a portable telephone terminal device 1100'' in the same direction (here, upper side). A vibrator 1131'' is arranged so that its force P2 (see FIG. 22) extends in the longitudinal direction. The fins 1311' are arranged in the same direction in plurality, and the vibration of the vibrator 1131'' enables the terminal device to be straightly moved to the upper side on water as shown with the movement direction M in FIG. 22.

In the underwater mode, the vibrator 1131'' causing this motion vibrates to move the terminal device 1100'' floating on water, and thereby, for example, an incoming call or an incoming mail can be found from the motion of the terminal device itself on water.

Although the plurality of protruding fins with the convex shape are arranged and thereby the terminal device is moved in the examples in FIG. 16 or 20, in contrast, depressed places (concave portions) with a concave shape are formed in plurality on the rear face, and the movement may be achieved by the working of the depressions. In addition, although the terminal device reciprocates at the time of the vibration of the vibrator in the example in FIG. 19 or 22, a rotation type vibrator is also possible as long as a force extends in the same direction.

[12. Description of a Modification According to the Third Embodiment]

The rotation of the terminal device on water, shown in FIG. 19, is made at the time of notification of an incoming call or the like in the above-described embodiments; however, any notifications may be made by use of a rotating position. For example, the terminal device includes a direction sensor, and an upper end of the terminal device may typically turn towards the same direction (for example, the north or the like) based on a direction detected by the direction sensor inside the terminal device.

Description of the examples according to the present invention described until now has been made as to application to the portable telephone terminal device; however, the present invention is applicable to various kinds of portable wireless communication devices in addition to the portable telephone terminal device.

The configurations shown in the respective drawings represent preferred examples, but the present invention is not limited to the shown configurations. For example, the portable telephone terminal device provided with the display portion has been described in each example; however, so-called a simple type portable telephone terminal device which is not provided with the display portion is also possible.

The present application contains subject matter related to that disclosed in Japanese Priority Patent Application JP 2009-134421 filed in the Japan Patent Office on Jun. 3, 2009, and Japanese Priority Patent Application JP 2009-134422 filed in the Japan Patent Office on Jun. 3, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A portable wireless communication device comprising:
a case having a waterproof structure and the case capable of floating on water;
an operation portion arranged in a front face of the case; and
a wireless communication processing portion arranged inside the case,
wherein a position of a center of gravity in the case is located on a rear face side opposite to the front face with respect to a center position of the case where all components including the wireless communication processing portion are housed, wherein when the case floats on the water, the rear face side is in the water and the front face side is upward.

2. The portable wireless communication device according to claim 1, further comprising a display portion arranged in the front face of the case.

3. The portable wireless communication device according to claim 1, further comprising an antenna connected to the wireless communication processing portion,
wherein the antenna is placed inside the case at a location higher than a water surface when the case floats on water.

4. The portable wireless communication device according to claim 1, wherein the rear face side of the case is thicker than the front face side, whereby the position of the center of gravity in the case is shifted to the rear face side with respect to the center of the case.

5. The portable wireless communication device according to claim 1, wherein the case includes an internal case housing the operation portion and the wireless communication processing portion, and an external case housing the internal case and having a waterproof structure.

6. A portable wireless communication device comprising:

a case having a waterproof structure;

a wireless communication processing portion arranged inside the case;

a control portion setting operation modes of the device to a mode selected of a normal mode and a water activated mode; and a sensor arranged in the case and detecting if the case is under water or on water, wherein the control portion sets the water activated mode when the sensor has detected that the case is under water or on water, and the control portion sets the normal mode when the sensor has not detected that the case is under water or on water.

7. The portable wireless communication device according to claim 6, wherein the control portion outputs a ring alert, which notifies of an incoming call or receipt of a message in wireless communication, in a state different from that in the normal mode when the water activated mode is set.

8. The portable wireless communication device according to claim 6, further comprising a vibrator notifying of an incoming call or receipt of a message in wireless communication by vibrating the case, wherein the control portion enables the vibrator to be vibrated in a state different from that in the normal mode when the water activated mode is set.

9. The portable wireless communication device according to claim 8, wherein predetermined ripples are generated on water by the vibration of the vibrator in the water activated mode.

10. The portable wireless communication device according to claim 8, wherein convex portions or concave portions are continuously arranged on a predetermined face of the case, and wherein the case floating on water is rotated or progressed in a predetermined direction by vibrating the vibrator in the water activated mode, in a state where the face with the convex portions or the concave portions is towards underwater.

11. The portable wireless communication device according to claim 6, further comprising an illumination portion illuminating a predetermined position of the case, wherein the control portion changes an illumination state in the normal mode and an illumination state in the water activated mode.

* * * * *